United States Patent [19]

Balzer et al.

[11] Patent Number: 4,985,154
[45] Date of Patent: Jan. 15, 1991

[54] PROCESS FOR THE EXTRACTION OF CRUDE OIL FROM AN UNDERGROUND DEPOSITE USING SURFACTANTS

[75] Inventors: Dieter Balzer, Haltern; Harald Lueders, Recklinghausen, both of Fed. Rep. of Germany

[73] Assignee: Huels Aktiengesellschaft, Marl, Fed. Rep. of Germany

[21] Appl. No.: 498,496

[22] Filed: Mar. 26, 1990

Related U.S. Application Data

[63] Continuation of Ser. No. 207,851, Jun. 17, 1988, abandoned.

[30] Foreign Application Priority Data

Jun. 19, 1987 [DE] Fed. Rep. of Germany ....... 3720330

[51] Int. Cl.$^5$ ............................................. E21B 43/22
[52] U.S. Cl. .................................................. 252/8.554
[58] Field of Search ............. 422/12; 252/8.554, 8.555

[56] References Cited

U.S. PATENT DOCUMENTS

```
4,125,156  11/1978  Glinsman .
4,258,789   3/1981  Hedges et al. .................... 252/8.554
4,265,308   5/1981  Hedges et al. .................... 252/8.554
4,286,660   9/1981  Wagner et al. .................... 252/8.554
4,705,665  11/1987  Malik ................................. 422/12
4,780,234  10/1988  Malik et al. ................ 252/174.14 X
```

OTHER PUBLICATIONS

*Kirk-Othmer Enclyclopedia of Chemical Technology* Exerpt, vol. 17, pp. 168-182, "Petroleum (Enhanced Oil Recovery)".

*Primary Examiner*—Robert L. Stoll
*Assistant Examiner*—Gary L. Geist
*Attorney, Agent, or Firm*—Oblon, Spivak, McClelland, Maier & Neustadt

[57] ABSTRACT

A process for the extraction of crude oil from an underground deposit which is penetrated by at least one injection well and at least one production well is disclosed. The process comprises forcing a solution or a dispersion of a surfactant co-solvent mixture into the injection well, wherein the surfactant is an alkyl (poly)glycoside of formula (I)

$$R-O-Z_n$$

wherein R is a linear or branched, saturated or unsaturated $C_{7-24}$ alkyl radical, and $Z_n$ is an (oligo)glycosyl radical having, on average, n=1 to 10 hexose or pentose units or a mixture thereof.

12 Claims, No Drawings

PROCESS FOR THE EXTRACTION OF CRUDE OIL FROM AN UNDERGROUND DEPOSITE USING SURFACTANTS

This application is a continuation of application Ser. No. 07/207,851, filed on Jun. 17, 1988, now abandoned.

BACKGROUND OF THE INVENTION

1. Field of the Invention

The present invention relates to processes for the extraction of crude oil from underground deposits.

2. Discussion of the Background

In the extraction of oil from source rock primary extraction processes generally only manage to raise a fraction of the oil originally present. In this case the oil reaches the earth's surface as a consequence of the natural pressure in the deposit. In secondary oil extraction, water is usually forced into one or more production wells in the formation and the oil is driven to one or more injection wells and then brought to the earth's surface.

This so-called water flooding as a secondary measure is relatively cheap and is used correspondingly frequently. But in many cases this method only leads to little additional oil extraction from the deposit.

Effective displacement of the oil, which is expensive but which is economically necessary in view of the future scarcity of oil, is achieved by tertiary measures. These are processes in which either the viscosity of the oil is lowered and/or the viscosity of water used for secondary flooding is raised and/or the interfacial tension between water and oil is lowered.

The majority of these processes can be classified as (1) dissolving or mixing flooding, (2) thermal oil extraction processes, (3) surfactant or polymer flooding or (4) as a combination of several of the processes mentioned.

Dissolving or mixing processes consist of injecting a solvent for the crude oil into the deposit. This solvent can be a gas and/or a liquid.

Thermal extraction processes include the injection of steam or hot water or they take place as underground combustion.

In the surfactant processes differentiation is made, depending on the surfactant concentration and possibly on the surfactant type and additives, between surfactant-assisted water flooding, micellar flooding and emulsion flooding. Surfactant-assisted water flooding is a process which, for example, can serve to increase the injection efficiency of injection wells or represents a "low-tension process." The action of the surfactant flooding is based primarily on a sharp reduction of the interfacial tension between oil and flooding water. The wettability of the rock surface and the mobility conditions are also of great importance. Favorable mobility conditions between oil and water are achieved by means of polymers.

These methods are not fully satisfactory however because they do not provide fully satisfactory results with varying levels of salinity in the deposits or with varying temperatures in the deposits.

SUMMARY OF THE INVENTION

Accordingly, it is an object of the present invention to provide a process for extraction of oil from oil deposits by surfactant or micellar-polymer flooding.

It is another object of the present invention to provide a process for increasing the injection efficiency of injection wells during water flooding of deposits with the aid of surfactants.

It is another object of this invention to provide such a process which provides excellent results with the salinity of the deposit being either low or very high.

It is another object of this invention to provide such a process which provides excellent results with either low or high temperatures of the deposit.

The inventors have now discovered a process for the extraction of crude oil from underground deposit which satisfies all of these objects and other objects which will become apparent from the description of the invention given hereinbelow. The process of the present invention is applicable to underground deposits penetrated by at least one injection well and at least one production well. In this process a solution or a dispersion of a surfactant/co-solvent mixture is forced into the injection well. The surfactant is an alkyl (poly)glycoside of formula (I)

wherein R is a linear or branched, saturated or unsaturated $C_{7-24}$ alkyl radical, and $Z_n$ is an (oligo)glycosyl radical having, on average, $n = 1$ to 10 hexose or pentose units or a mixture thereof.

DETAILED DESCRIPTION OF THE PREFERRED EMBODIMENTS

The present invention relates to a process for extraction of oil from oil deposits by surfactant or micellar-polymer flooding. It also relates to a process for increasing the injection efficiency of injection wells during water flooding of deposits with the aid of surfactants. In this process the salinity of the deposit can be low or it can be very high. The same applies to the temperature of the deposit.

The invention applies in particular to processes for deposits which are dominated by severe variations in salinity or a salinity gradient and/or severe temperature variations or a temperature gradient.

Severe variations in salinity in a deposit are caused primarily by the use during secondary measures not of formation water but of a water of some other composition. Frequently this is readily-available river-water or sea water or even a formation water from another, usually nearby, deposit. The reasons for the use of this water from a source external to the deposit are almost always of logistical nature.

As the temperature of the source rock is determined essentially by the heat flow from the interior of the earth to the surface region temperatures, source rock temperature which are not constant are caused by sharp inclinations in the deposit or by a disruption of the natural state. Such a disruption is, for example, the injection of water during the water flooding. Long-lasting water flooding, especially of high-temperature deposits, often leads to the formation of a temperature gradient.

A deposit which is dominated simultaneously by changing temperatures and salinities is, for example, a high-temperature offshore field which is flooded with cold sea water which leads to intense cooling around the injection zones. This is particularly true if the salinities of the formation water and the sea water differ sharply.

However, a surfactant flooding process should naturally be optimally effective over the entire temperature range which prevails either in the entire deposit or, as in the case of injection well stimulation, in the region of the deposit around the injection well. Obviously, the surfactant concerned should be exceptionally compatible with salinity as the formation water in the majority of deposits contains salts in high concentrations.

However, those surfactants which have proved to be very suitable in surfactant flooding processes such as, for example, alkyl-, alkylaryl- or petroleum-sulphonates, have a very low tolerance limit to the salinity of the deposit water. Even salt concentrations of 1,000 ppm are often considered problematical, the sensitivity of these surfactants to alkaline earth metal ions being particularly pronounced. A concentration of 500 ppm is mentioned in U.S. Pat No. 4,110,228 as the upper critical concentration limit of the salinity.

When the surfactants mentioned are used in the presence of higher salt concentrations precipitation products are formed in the form of insoluble salts. In this way, on the one hand material for the desired interfacial surface effect at the water-oil and/or water- or oil-rock interfaces is lost and on the other hand the precipitation products can lead to clogging of the formation. However, many deposit waters have substantially higher salinities. A very considerable proportion of the North American light-oil deposits have salinities of 100,000 ppm and higher, in the majority of cases the content of dissolved alkaline earth metal ions being substantial.

Typical surfactants which are tolerant even to extremely high total salinities and corresponding alkaline earth metal ion concentrations and are highly effective for mobilizing oil are compounds of the type of carboxymethylated ethoxylates, ether sulphonates and ether sulphates, such as are described in U.S. Pat. No. 4,293,428, U.S. Pat. No. 4,299,711, U.S. Pat. No. 4,485,873 and EP-B1 No. 0,064,384. However to display optimum effectiveness during surfactant flooding they presuppose a fairly constant salinity and temperature. This can be demonstrated by measuring the oil/aqueous surfactant solution interfacial tension as a function of the temperature or salinity. With carboxy-methylated ethoxylates, for example, (cf. D. Balzer, Proceedings 2nd European Symposium Enhanced Oil Recovery, Paris 1982) the interfacial tension passes through a deep, narrow minimum at a certain temperature. The same applies to investigations into the salinity relationship (cf. H. R. Kraft and G. Pusch, SPE/DOE 10714, 3rd Joint Symposium Enhanced Oil Recovery). At significantly lower or higher temperatures or salinities the surfactant has a very much lower interfacial activity towards the deposit oil concerned and hence a restricted effectiveness in oil mobilization.

There are, in fact, defacto solutions to this problem in that surfactant mixtures of relatively hydrophilic carboxymethylated ethoxylates and hydrophobic sulphonates are used in the presence of a co-solvent. As described in DE-A 3,523,355, the strongly oil-mobilizing action of these mixtures is largely independent of temperature so that they are capable of overcoming even extreme variations in time and place of the temperature. The effectiveness of such mixtures is also far less dependent on the salinity than is that of the individual surfactants.

However, it still remains to be clarified as to whether their effectiveness is appreciably impaired by extremely intense changes in salinity such as generally occur when the saline water in deposits is displaced by surface water. A more important reservation concerns the fact that with this solution to the problem mixtures of surfactants are used which differ very sharply both with respect to the class of surfactant (modified, non-ionic surfactant-/typical anionic surfactant) and also to the hydrophilic-hydrophobic balance and consequently can become physically separated under the conditions in the deposit. At the least this leads to loss of effectiveness of the surfactant mixture. However, in the case of high alkaline earth metal concentrations in the deposit water or in the flooding water precipitation of alkaline earth metal soaps can occur and there is obvious risk of clogging the pore space.

There is therefore the problem of finding a single surfactant for crude oil deposits of very variable salinities which has a strong oil-mobilizing action even with intense variations in salinity and/or temperature.

This problem is solved in a surprising manner by the process for extraction of crude oil from an underground deposit provided by the present invention. In this process the deposit is penetrated by at least one injection well and one production well and a solution or a dispersion of a surfactant/co-solvent mixture is forced into the injection well. This process is characterized in that an alkyl (poly)-glycoside of the formula $$R-O-Z_n$$

is used as the surfactant. Variable R in the above formula represents a linear or branched, saturated or unsaturated, alkyl radical having 7 to 24 carbon atoms, and variable $Z_n$ represents an (oligo)glycosyl radical having, on average, n=1 to 10, preferably 1.4 to 5, hexose or pentose units or mixtures thereof.

It is advisable if mono- or polyhydric alcohols or alkyl ethers of polyhydric alcohols are used as the co-solvent, or also alkyl (poly)glycosides of the formula $$R'-O-Z_{n'}$$

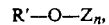

in which variable R' is a linear or branched alkyl radical having 3 to 6 carbon atoms and n is 1 to 3. It is advantageous if the surfactant/co-solvent weight ratio is 1:5 to 5:1, preferably 1:3 to 3:1.

The surfactant/co-solvent mixture to be injected, dispersed in formation or flooding water, should have a concentration of 0.1 to 30% by weight, preferably 0.2 to 15% by weight.

It is preferable for the size of the slug of surfactant-containing liquid to be injected to be 0.002 to 2 pore volumes. Preferably formation water or flooding water is forced into the deposit after the injection of the slug of surfactant-containing liquid.

In a preferred embodiment of the process the formation or flooding water contains a soluble, viscosity-raising polymer.

Instead of the alkyl polyglycoside as the single surfactant it can also be advantageous in some cases to use in a mixture with other surfactants. This presupposes that no disadvantageous effects appear.

The suitability of the alkyl polyglycosides in combination with co-solvents for solving the problem is completely unexpected in a number of respects. Alkyl polyglycosides are non-ionic surfactants and, according to K. Shinoda and H. Kunieda in L. M. Prince "Microemulsions, Theory and Practice", New York, 1977, non-ionic surfactants require no co-solvents to form middle-phase microemulsions, the existence of which is known to be a prerequisite for mobilizing oil in the pore space of the deposit.

The glycolipids described in DE-PS 2,645,506 and DE-PS 2,645,507 which can be prepared by the extraction of biological material and which show a certain similarity to the alkyl polyglycosides in accordance with the invention also require no cosolvents to develop optimum effectiveness in the mobilization of oil, as is emphasized in the text.

However, according to our investigations with various crude oils and model oils and water of very differing salinities (between 0 and 22% TDS) the formation of middle-phase microemulsions with the alkyl polyglycosides to be used in accordance with the invention was surprisingly observed only in the presence of suitable co-solvents even after long equilibration times, and as will be illustrated in the process examples—the results of the trials of oil mobilization in the pore space also correspond to these findings. Clearly therefore the similarity of the alkyl polyglycosides to be used in accordance with the invention to the abovementioned stereochemically fully homogeneous glycolipids is only of a formal nature.

The glycolipids have the grave disadvantage that their preparation is very expensive and involved on account of the extremely low space-time yield. That is, a cost-effective application is inconceivable even in the long term. However, the alkyl polyglycosides to be used in accordance with the invention can, as is well known, be prepared by simple, commercial-scale processes completely or partially based on renewable raw materials.

For example, dextrose in the presence of an acid catalyst is converted by n-butanol to mixtures of butyl oligoglucosides which are transglycosidized by long-chain alcohol, likewise in the presence of an acid catalyst, to form the required alkyl oligoglucoside mixtures. The structure of the $R—O—Z_n$ products can be varied within wide limits. The alkyl radical R is determined by the choice of the long-chain alcohol. Branched or unbranched, saturated or unsaturated alcohols having 7 to 24 carbon atoms can be used, either singly or as a mixture.

On economic grounds the commercially available surfactant alcohols having 9 to 18 carbon atoms are preferred, for example, oxoalcohols, Ziegler alcohols or natural alcohols from the hydrogenation of fatty acids or fatty acid derivatives. Typical alcohols here are octyl alcohol, ethylhexyl alcohol, nonyl alcohol, decyl alcohol, undecyl alcohol, lauryl, tridecyl, myristyl, palmityl and stearyl alcohols, but also unsaturated alcohols such as, for example, oleyl alcohol.

The oligoglycosyl radical $Z_n$ is determined on the one hand by the choice of the carbohydrate and on the other hand by setting the average degree of oligomerization, n, such as is described, for example, in DE-OS 1,943,689 (=U.S. Pat. No. 3,547,828).

In principle, known polysaccharides, oligosaccharides and monosaccharides, for example, starch, maltodextrin, dextrose, galactose, mannose, xylose, etc., can be converted to alkyl oligoglycosides. The commercially available carbohydrates starch, maltodextrins and dextrose are especially preferred as raw materials.

As the alkyl oligoglycoside syntheses which are economically interesting do not proceed regio- or stereoselectively, the alkyl oligoglycosides are always mixtures of oligmers, which in turn represent mixtures of various isomeric forms. They are present in the pyranose and furanose forms together with alpha- and beta-glycoside compounds. Even between two saccharide groups the points of linkage are different.

The co-solvents to be used in accordance with the invention can be monohydric alcohols having 3 to 8 carbon atoms such as, for example, propanol isomers, butanol isomers, pentanol isomers, hexanol isomers, octanol isomers, etc. or polyhydric alcohols having 3 to 10 carbon atoms such as propanediol, butanediol, pentanediol, hexanediol, octanediol, decanediol, etc. or alkyl ether polyhydric alcohols having 2 to 8 carbon atoms in the alkyl chain such as ethylene glycol monoethyl ether, ethylene glycol monoisopropyl ether, ethylene glycol monobutyl ether, diethylene glycol monobutyl ether, ethylene glycol monopentyl ether, -monohexyl ether, -monooctyl ether, diethyleneglycol monoethyl ether, -monopropyl ether, -monopentyl ether, -monohexyl ether, -monooctyl ether, etc. or alkyl polyglycosides having short-chain alkyl radicals (3 to 6 carbon atoms) such as, for example, butyl (oligo)glucoside, butyl (oligo)mannoside, butyl (oligo)galactoside, propyl (oligo)glucoside, propyl (oligo)mannoside, propyl (oligo)galactoside, pentyl (oligo)glucoside, pentyl (oligo)mannoside, pentyl (oligo)galactoside, hexyl (oligo)glucoside, hexyl (oligo)mannoside, hexyl(oligo)galactoside, etc. Depending on the preparation process it is then also possible to prepare the two alkyl polyglycosides surfactant and co-solvent—together in the required ratio.

The alkyl (poly)glycoside/co-solvent mixtures to be used in accordance with the invention must be suited to the conditions of the deposit system concerned. Critical parameters in this case are the constituents of the deposit water and, unless this is reinjected, also the composition of the flooding water, and also the nature of the deposit oil, the temperature, or temperature range, of the deposit and, if necessary, the composition of the gas phase and the deposit pressure. The phase investigations known from the literature approximately along the lines of a phase-volume diagram (cf. H. Kraft, G. Pusch, SPE/DOE Paper 10714), in which the volumes of the upper, middle and lower phases of a mixture of deposit oil, deposit water or flooding water, and surfactant or surfactant/ co-surfactant are determined as a function of temperature constitute the preliminary trials to adapt the surfactant system to the deposit conditions.

What is required is a surfactant/co-surfactant combination which leads to a phase behavior which is largely independent of temperature and/or salinity and has pronounced formation of a middle-phase microemulsion. However, such a result is not sufficient in itself. Investigations with other surfactant/co-solvent combinations have in fact on occasions shown the desired phase behavior but not the oil extraction investigated in parallel with it in flooding tests. Necessary further tests for adapting the surfactant system to the deposit which give a direct indication of its effectiveness therefore consist of linear displacement trials in model formations made of sandstone or sand, the so-called flooding trials, such as are described in the examples. In contrast to the phase investigations in which an equilibrium state is considered which does not really occur during the surfactant flooding, the displacement trials consider the non-equilibrium processes which actually take place in the deposit.

If an actual surfactant flooding process such as micellar/polymer flooding is to be carried out in the deposit concerned, then flooding tests are advisable with, as far as is possible, original core material under—where necessary—the conditions of the deposit concerned. They serve to provide laboratory optimization of the surfactant/co-surfactant system with respect to the liquid form of the active ingredient (solution, dispersion or emulsion), its concentration and its volume, and with respect to the type, concentration and volume of the polymer solution to be used as the mobility buffer.

Based on these preliminary trials the surfactant solution or dispersion is loaded into the deposit by injection pumps. This is carried out in the form of slugs, that is limited volumes of 0.002 to 2 PV (PV=pore volume of the deposit), preferably 0.02 to 1.2 PV. The size of the surfactant slug is governed by the surfactant concentration and by the cost effectiveness. The surfactant concentration normally lies between 0.1 and 20% by weight, preferably between 0.2 and 8% by weight. The concentration of the co-solvent depends on the surfactant concentration and lies within the proportions of 1:5 to 5:1 in relation to it.

It is advisable, if flooding with water is carried out before injection of the surfactant liquid, that the formation water produced normally be used as the flooding water. In special cases—usually on logistical grounds it can be advisable to flood with water of a composition other than that of the formation water. The size of the flooding water slug is 0.01 to 4 PV, preferably 0.1 to 2 PV.

Both on grounds of mobility control—as mentioned—and to protect the surfactant liquids from the flooding water forced in, the polymer solution can be injected into the deposit after the last surfactant liquid. For this purpose a polymer or a polymer mixture is dissolved in the flooding water in a concentration to give a viscosity 1.2 to 10 times higher than that of the oil under the conditions of the deposit. Suitable polymers are biopolymers such as, for example, xanthan gum, or cellulose derivatives and polyacrylamides, which still have sufficient viscosity in the presence of the given salinity and show no precipitation. It is advisable that normal flooding water follows immediately after the injection of the polymer solution, to act as the driving force. This is continued for as long as it is possible to extract oil profitably.

In the case of injection well treatment to increase the injection efficiency during water flooding, the quantity of active ingredient to be forced in, that is the volume and concentration of the alkyl polyglycoside/co-solvent mixture is determined primarily by the pore space in the immediate vicinity of the injection well which is to be freed from the residual oil. In general, it is sufficient to treat the injection area up to about 3 to 20 m distance from the injection well. Higher quantities of active ingredient can be advantageous but their use signifies even higher costs. Accordingly, between 0.005 and 0.2 PV of the solution of active ingredient should be injected. The surfactant concentration should lie between 0.05 and 7% by weight. In this case the concentration of the co-solvent should lie between 1:5 to 5:1 of the surfactant concentration.

Injection efficiency tests on the model formations have shown that for the same quantity higher volumes and lower concentrations lead to more favorable results than in the reverse case.

After laboratory adaptation of the surfactant/co-solvent system to the current deposit conditions by analogous phase investigations, such as have already been described above for surfactant flooding, in which the attempt is made to achieve, in addition to the conditions of the middle-phase microemulsion, that of a microemulsion where water is the continuous phase or subphase microemulsion, and after the considerations of the deposit with respect to concentration and volume of the surfactant/co-solvent mixture, the solution of the active ingredient is forced into the injection zone by pumps. After that the water flooding process is started or stopped. This well treatment can be repeated if necessary.

Other features of the invention will become apparent in the course of the following descriptions of exemplary embodiments which are given for illustration of the invention and are not intended to be limiting thereof.

The following examples illustrate the process according to the invention. They comprise phase investigations (to demonstrate the effectiveness, which is to a great extent independent of the salinity and temperature), linear displacement trials in sandstone cores (to show the effectiveness of the alkyl polyglycoside/co-solvent mixture with surfactant or micellar-polymer flooding), and injection efficiency tests in loose-packed beds of sand (to demonstrate the effect during injection well treatment).

EXAMPLE 1

Equal volumes of n-decane and water of differing salinities in graduated, closed, glass cylinders were allowed to reach equilibrium in the presence of 4% $C_{12}$-$C_{13}$-alkyl oligoglucoside with 1.4 mol glucose units per mol and 4% 2,2,4-trimethylpentane-1,3-diol as the co-solvent at 20°, 50° and 70° (C.). As is shown in Table 1, the volume of the middle phase is remarkably independent of simultaneous alterations in salinity and temperature.

TABLE 1

| Salinity NaCl (%) | Middle-phase volumes (% by volume) as a function of the salinity and temperature |||
|---|---|---|---|
| | Middle-phase volume at |||
| | 20° C. | 50° C. | 70° C. |
| 0 | 18 | 18 | 17 |
| 0.5 | 18 | 18 | 17 |
| 2 | 19 | 19 | 18 |
| 5 | 18 | 20 | 19 |
| 10 | 17 | 19 | 20 |

EXAMPLES 2 TO 11

Linear displacement trials were carried out on model formations made of Bentheim sandstone, for which cylindrical cores of length 50 cm and diameter 8 cm were embedded in epoxide. The pore volumes were about 600 ml. The temperature control of the embedded cores was carried out in an open temperature bath. First, the core was wetted with water using a diaphragm pump, the absolute permeability also being measured after saturation. After that, saturation was carried out with a model oil (n-decane), oil in place and absorbed water being determined at the same time.

Approximately 1.5 PV flooding water was then injected with a flooding velocity of approximately 0.5 m/d which resulted in a dilution of 99 to 100%. After this so-called water flooding first the surfactant and then the polymer solutions were injected. In all the displacement trials, after the injection of 0.3 PV surfactant solution at a concentration of 4% alkyl polyglycoside and 4% co-solvent, 0.6 PV of a 0.2% solution of Polymer-Flocon 4800 (xanthan, Pfizer) in the water concerned was forced into the sandstone.

The following substances were used in the examples in accordance with the invention.

| | Oils |
|---|---|
| D | n-decane 96% |
| H | n-heptane 99.8% |
| | Waters |
| VE | fully desalinated water |
| S | synthetic seawater 1.12% $Na^+$, 0.035% $K^+$, 0.047% $Ca^{++}$, 0.133% $Mg^{++}$, 2.03% $Cl^-$ |
| W | synthetic formation water 3.6% $Na^+$, 0.28% $Ca^{++}$, 0.12% $Mg^{++}$, 6.4% $Cl^-$, 0.014% $HCO_3^-$ |
| N | 10% NaCl solution |
| A | highly saline formation water 7.9% $Na^+$. 0.05% $K^+$, 0.4% $Ca^{++}$, 0.1% $Mg^{++}$, 13.3% $Cl^-$. |
| | Alkyl polyglycosides |
| $A_1$ | decyl dodecyl oligoglucoside with 1.2 mol glucose units per mol |
| $A_2$ | dodecyl tetradecyl oligoglucuside with 2.3 mol glucose units per mol |
| $A_3$ | dodecyl tridecyl oligoglucoside with 1.4 mol glucose units per mol |
| $A_4$ | dodecyl tridecyl oligoglucoside with 2.7 mol glucose units per mol |
| | Co-solvents |
| $E_1$ | isobutanol (99.5%) |
| $E_2$ | tertiary amylalcohol (98%) |
| $E_3$ | ethylene glycol monobutyl ether (99%) |
| $E_4$ | 2,2,4-trimethylpentane-1,3-diol (98%) |

The examples (Table 2) show that the alkyl polyglycoside/co-solvent mixtures in accordance with the invention make extensive tertiary oil extraction possible over a very wide range of salinity and temperature.

EXAMPLES 12 TO 14

Injection efficiency tests were carried out in loose-packed beds of sand, in some cases with the addition of kaolin to simulate an argillaceous formation (Bolus Alba, specific surface area 14.5 m²/g, additive 5%).

To prepare loose-packed beds of sand a steel tube, with temperature control, of length 70 cm and diameter 5 cm, equipped with temperature gauge and manometer, which could be closed at both ends by threaded stoppers with capillary inlet and pressure-retaining valve outlet was filled with quartz sand with rounded edges. After this the loose-packed bed of sand was wetted with water using a diaphragm pump and brought to the required temperature with a thermostat. The permeability of the loose-packed bed was determined with the aid of pressure transmitters. The artificial formation was then saturated with n-decane as the model oil.

The water involved was then injected at a rate of approximately 10 m/d until a constant dilution of 98 to 100% and a constant pressure gradient were achieved over a fairly long period (approximately 0.5 PV). A pressure gradient deltaP$_1$ was recorded corresponding to a flooding rate Q$_1$. After this water flooding the solution or dispersion of the active ingredient was injected. It had a concentration of 0.5% alkyl polyglycoside and 0.5% co-solvent and a volume of 3 PV on the grounds that the model formation should not represent the pore space between the injection and production wells but only the nearer part of the injection zone. In many cases after only a short injection period a sharp fall of the pressure gradient was observed at constant injection rate, or else the latter could be increased sharply without an increase in the pressure gradient. More water was then injected. The pressure gradient deltaP$_2$ was then recorded under steady-state conditions at a flooding rate Q$_2$. A measure of the increase in injection efficiency is the parameter of which can be determined from the measured data as follows $$f = \frac{Q_2}{\text{delta}P_2} \cdot \frac{\text{delta}P_1}{Q_1}$$

If f is greater than 1 then there is an increase in the injection efficiency. If f is less than 1 then the injection efficiency is impaired.

Three examples in accordance with the invention are shown in Table 3 with which it is demonstrated that the injection efficiency can be sharply increased by the injection of alkyl polyglycosides in combination with co-solvents. The substances used in these trials have already been described in the linear displacement trials.

TABLE 2
LINEAR DISPLACEMENT TRIALS

| No. | Formation permeability (D) | Oil | Water | Temp. (°C.) | Surfactant | Co-solvent | deltaE$_w$* (%) | deltaE$_T$* | deltap** (bar/m) |
|---|---|---|---|---|---|---|---|---|---|
| 2 | 2.1 | D | S | 50 | $A_2$ | — | 51 | 0 | 2 |
| 3 | 1.2 | D | S | 50 | $A_2$ | $E_1$ | 54 | 37 | 0.6 |
| 4 | 1.6 | D | W | 50 | $A_2$ | $E_2$ | 48 | 24 | 1.4 |
| 5 | 1.7 | H | S | 50 | $A_2$ | $E_3$ | 52 | 33 | 0.7 |
| 6 | 2.2 | D | S | 20 | $A_1$ | $E_1$ | 51 | 37 | 1.3 |
| 7 | 2.1 | D | S | 50 | $A_1$ | $E_1$ | 56 | 23 | 0.4 |
| 8 | 1.6 | D | A | 50 | $A_1$ | $E_1$ | 52 | 25 | 0.6 |
| 9 | 0.9 | D | VE | 20 | $A_3$ | $E_4$ | 49 | 21 | 0.8 |
| 10 | 1.9 | D | VE | 60 | $A_3$ | $E_4$ | 40 | 32 | 0.6 |
| 11 | 2.0 | D | N | 20 | $A_3$ | $E_4$ | 35 | 17 | 1.1 |

*DeltaE$_w$ or deltaE$_T$ signify the oil extraction (% OOIP) by water flooding or subsequent surfactant flooding.
**Deltap is the maximum pressure gradient.

TABLE 3

| No. | Formation permeability (D) | Oil | Water | Temp. (°C.) | Surfactant | Co-solvent | f |
|---|---|---|---|---|---|---|---|
| 12 | Sand 0.9 | D | VE | 20 | $A_3$ 0.5% | $E_4$ 0.5% | 1.8 |
| 13 | Sand/kaolin 0.2 | D | S | 20 | $A_4$ 0.5% | $E_1$ 0.5% | 2.7 |

TABLE 3-continued

| No. | Formation permeability (D) | Oil | Water | Temp. (°C.) | Surfactant | Co-solvent | f |
|---|---|---|---|---|---|---|---|
| 14 | Sand 0.8 | D | S | 50 | $A_4$ 0.5% | $E_1$ 1% | 2.1 |

Obviously, numerous modifications and variations of the present invention are possible in light of the above teachings. It is therefore to be understood that within the scope of the appended claims, the invention may be practiced as otherwise than as specifically described herein.

What is claimed as new and desired to be secured by Letters Patent of the United States is:

1. A process for the extraction of crude oil from an underground deposit which is penetrated by at least one injection well and at least one production well, said process comprising forcing a solution or a dispersion of a surfactant co-solvent mixture into said injection well, wherein said surfactant is an alkyl (poly)glycoside of formula (I)

$$R-O-Z_n$$

wherein R is a linear or branched, saturated or unsaturated $C_{7-24}$ alkyl radical, and $Z_n$ is an (oligo)-glycosyl radical having, on average, n=1 to 10 hexose or pentose units or a mixture thereof.

2. The process of claim 1, wherein a mono- or polyhydric alcohol or an alkyl ether of a polyhydric alcohol is used as said co-solvent.

3. The process of claim 1, wherein an alkyl (poly)-glycoside of formula (II)

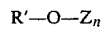

$$R'-O-Z_n$$

is used as said co-solvent, wherein R' is a branched or linear $C_{3-6}$ alkyl radical and n signifies numerical values on average of 1 to 3.

4. The process of claim 1, wherein said solution or said dispersion has a surfactant/co-solvent weight ratio of 1:5 to 5:1.

5. The process of claim 1, wherein said solution or said dispersion has a surfactant/co-solvent weight ratio of 1:3 to 3:1.

6. The process of claim 1, wherein said surfactant/co-solvent mixture to be injected, dispersed in formation or flooding water, has a concentration of 0.1 to 30% by weight.

7. The process of claim 1, wherein said surfactant/co-solvent mixture to be injected, dispersed in formation or flooding water, has a concentration of 0.2 to 15% by weight.

8. The process of claim 1, characterized in that the size of a slug of said solution or dispersion of said surfactant-cosolvent mixture injected is 0.002 to 2 pore volumes.

9. The process of claim 1, characterized in that formation water or flooding water is forced into the deposit after the injection of slug of said solution or dispersion of said surfactant-cosolvent mixture.

10. The process according to claim 9, characterized in that the formation or flooding water contains a soluble, viscosity-raising polymer.

11. The process of claim 1, characterized in that in formula I, n has an average value of 1.4 to 5.

12. The process of claim 1, characterized in that R represents an alkyl radical having 10 to 18 carbon atoms.

* * * * *

UNITED STATES PATENT AND TRADEMARK OFFICE
CERTIFICATE OF CORRECTION

PATENT NO. : 4,985,154
DATED : January 15, 1991
INVENTOR(S) : Dieter Balzer et al It is certified that error appears in the above-identified patent and that said Letters Patent is hereby corrected as shown below:

On the title page item [54], and in column 1, line 2.
    In the title, please delete "DEPOSITE" and insert

--DEPOSIT--.

Signed and Sealed this

Twenty-eighth Day of July, 1992

*Attest:*

DOUGLAS B. COMER

*Attesting Officer*      *Acting Commissioner of Patents and Trademarks*